United States Patent [19]

Walsh

[11] 4,029,185

[45] June 14, 1977

[54] TORQUE TRANSMITTING AND INDICATING DEVICE

[75] Inventor: Michael M. Walsh, Northville, Mich.

[73] Assignee: Eaton Corporation, Cleveland, Ohio

[22] Filed: Nov. 3, 1975

[21] Appl. No.: 628,000

[52] U.S. Cl. .............................. 192/30 W; 74/520; 81/52.5; 116/67 R; 192/43.1; 192/56 L

[51] Int. Cl.[2] ................ F16D 41/16; B25B 23/142; G08B 3/02

[58] Field of Search ............. 192/30 W, 43.1, 56 R, 192/56 L; 74/520; 81/62, 63, 52.5; 116/67 R

[56] References Cited

UNITED STATES PATENTS

| | | | |
|---|---|---|---|
| 460,474 | 9/1891 | Knapp et al. | 192/43.1 |
| 2,074,079 | 3/1937 | Bahr et al. | 81/62 |
| 2,300,652 | 11/1942 | Cooney | 81/52.5 |
| 2,365,486 | 12/1944 | Morris | 81/52.5 |
| 3,338,359 | 8/1967 | Baillie et al. | 192/43.1 |
| 3,742,786 | 7/1973 | Krain | 81/52.5 |

*Primary Examiner*—Allan D. Herrmann
*Attorney, Agent, or Firm*—Teagno & Toddy

[57] ABSTRACT

A device particularly adapted to transmit torque to a lever operated hoist for moving a load and including a torque transmitting toggle linkage mechanism biased to an operative position for transmitting the torque required to move loads not exceeding a predetermined magnitude upon movement of the hoist input lever and moveable to an indicating position upon movement of the input lever against a load in excess of the predetermined value. In some embodiments the movement of the toggle linkage to its indicating position occurs suddenly as in a snap action and a stop is provided on the input lever for arresting the movement of the linkage to create an audible indication of the movement of an overload. In other embodiments, means are provided to disengage the device from the hoist upon movement of the linkage to its indicating position.

23 Claims, 7 Drawing Figures

TORQUE TRANSMITTING AND INDICATING DEVICE

BACKGROUND OF THE INVENTION

1. Field of the Invention

The present invention relates generally to devices for transmitting torque wherein is included means for indicating the transmission of torque in excess of a predetermined value. The present invention relates more particularly to the provision of such devices in lever operated hoists.

2. Description of the Prior Art

Proper mechanical design of lever operated hoists and other devices employing a rotary mechanical input require limitation of the loads carried by the devices. To allow the devices to function for their entire design life, overloading above a rated value should be either prevented entirely or should be limited to occasional occurrence by indicating to the user that an overload is present so that continuous or repetitive loading at this level may be avoided. Devices for limiting the load capacity of or for indicating the existence of an operating overload in lever operated hoists are therefore well known in the prior art. The prior art devices, however, have certain major disadvantages. One of these disadvantages can be seen in devices which limit the load to be moved by use of a regulator such as is described in U.S. Pat. No. 3,776,514 to Eggleton, Jr. et al. A large number of relatively complex parts are employed to accomplish the overload prevention function, the successfully consistent operation of which is dependent upon frictional forces between brake parts.

Another disadvantage of the prior art hoists may be seen in the type which indicate the existence of an overload through deflection of the outer end of the input drive lever handle such as that disclosed in U.S. Pat. No. 3,772,316 to Hawkins et al. Hoists of this type readily lend themselves to abuse, since tubular extensions which engage the input lever inboard of its indicating portion may be used by operators to increase their mechanical advantage. This practice, which is a common mechanical expedient, both increases the likelihood of overload and prevents operation of the mechanism intended to indicate the existence of the overload.

SUMMARY OF THE INVENTION

In light of the disadvantages seen in the prior art it is an object of the present invention to provide a torque transmitting device which employs a minimal number of simple, readily manufacturable parts to perform the functions of transmitting torque through a positive mechanical connection and of indicating the transmittal of torque in excess of a predetermined value.

It is a further object of the invention to provide a torque transmitting device having means for indicating the transmittal of torque in excess of a predetermined value for use in a lever operated mechanism wherein the indicating means is insensitive to the use of means for extending the lever arm during operation.

According to one feature of the invention torque is transmitted by a simple toggle linkage biased into a driving position for the transmittal of torque below a predetermined value and moveable to an indicating position upon exceeding that value thereby employing a single simple mechanical element for both the transmitting and indicating functions.

According to another feature of the invention the torque transmitting indicating device is positioned in a lever operated mechanism proximate the pivotal axis of the lever thereby rendering the device insensitive to extensions of the lever arm.

DESCRIPTION OF THE PREFERRED EMBODIMENTS

Figure 1:
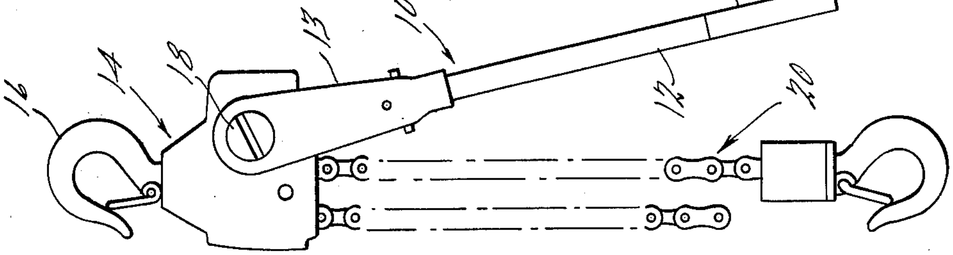
FIG. 1 is a plan view of the torque transmitting device of the present invention illustrating its installation in a lever operated hoist.

Referring first to FIG. 1, the invention torque transmitting device 10 is illustrated as comprising the input drive lever 12 of a manually operated hoist indicated generally at 14. The hoist 14 is adapted to be secured to a fixed support (not shown) through a hook 16 or similar fastening member. The input drive lever 12 is operatively connected to an input drive shaft having a ratchet wheel portion 18 or similar input drive member which drives the hoist in a known manner to draw or release a load (not shown) with mechanical advantage. The load may be connected to the output member of the hoist 14 through a hook and chain 20 or similar apparatus.

The means for effecting the transmittal of torque from the input drive lever 12 to the ratchet wheel 18 of the present invention may best be seen by reference to FIGS. 2–5. The lever 12 is preferably formed from two substantially identical stampings or the like 15 and 17 suitably joined as by welding. It includes a handle portion 11 and an enlarged drive housing portion 13 formed proximate the pivotal axis of the input drive lever 12 and containing a force transmitting and torque indicating assembly 22. The assembly 22 comprises a carrier subassembly 24, a pawl drive subassembly 26, and a selector subassembly 28.

The carrier subassembly 24 is illustrated as comprising a pair of generally triangular plates 30 and 32 having inward extending U-shaped tab portions 34 and 36 at the end thereof remote from the pivotal axis of the ratchet wheel 18. The plates 30 and 32 receive a shouldered pin 38 and are rotatable about the axis thereof. Pin 38 may be fixedly secured to the plates 30, 32 by press fitting, staking, or like means or may be rotatively received. The pin 38 is carried and simply supported by shouldered bushings 40 and 42 which may be formed of an antifriction material. Lateral centrality in the generally rectangular cross-section of drive housing portion 13 is maintained by the shoulders of the pin 38 and by the use of spacers 44 and 46 disposed between the outer surfaces 48 and 50 of the plates 30 and 32 respectively and the inner surfaces 52 and 54 of bushings 40 and 42 respectively.

Pawl drive subassembly 26 is illustrated as including a pair of pawls 56 and 58 pivotally mounted between the plates 30 and 32 on a pair of shouldered pins 60 and 62 extending therebetween. Pins 60 and 62 may be rotatively received by the plates 30, 32 or may be fixedly secured thereto in the same manner as the pin 38. The ends 64 and 66 of the pawl 56 and 58, respectively, which are proximate the pivotal axis of the input drive lever 12 are suitably formed to be engageable with the teeth 68 of the ratchet wheel 18 as may best be seen in FIGS. 4 and 5. The pawls 56 and 58 further include seat portions 69 and 70 adapted to receive opposite ends of a helical spring 72 having a low spring rate, and indicating portions 74 and 76 positioned proximate carrier pivot pin 38, the purpose of which will be hereinafter described. An adjustment set screw 78 is threadedly received in indicating portion 74 passing therethrough to abut carrier pivot pin 38. In certain embodiments another adjustment set screw may be threadedly received in the indicating portion 76.

The selector subassembly 28 includes a selector bar 80 received in apertures 82 and 84 passing through the hub portion 13 perpendicular to its longitudinal axis, a shouldered pin 86 slideably received in slots 88 and 90 in carrier plates 30 and 32 respectively, and a spring 92 seated on the U-shaped tab portions 34 and 36 and engaging the pin 86. Selector bar 80 includes a notch 94 having an included angle of approximately 90 degrees into which the pin 86 is urged by the spring 92. The selector bar 80 also includes symmetrically positioned pairs of detent notches 96, 98, and 100, 102 formed on the face thereof opposite the notch 94.

Figure 7:
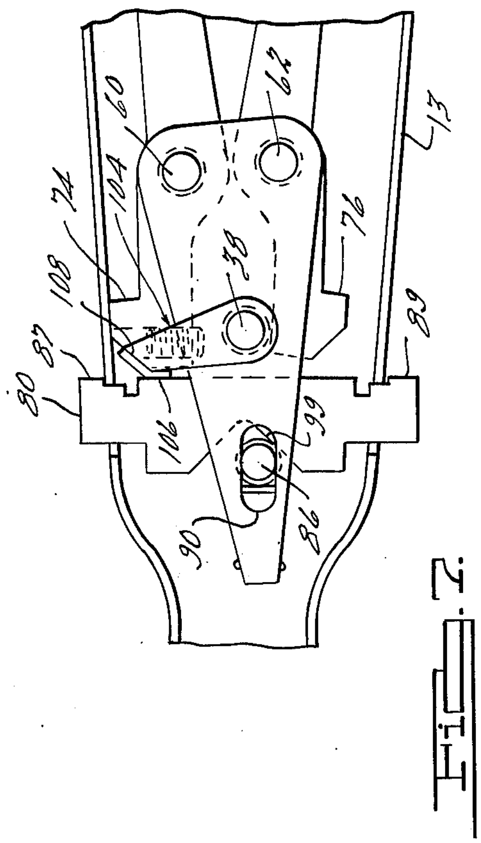
FIG. 7 is a fragmentary cross-sectional view of the alternative embodiment in an operative position.
Figure 6:
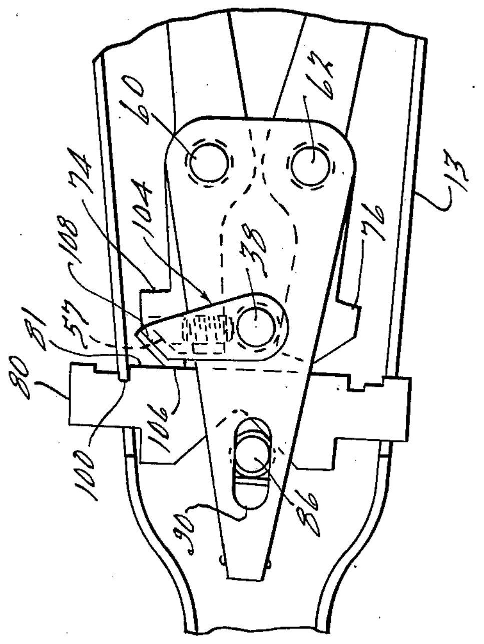
FIG. 6 is a fragmentary cross-sectional view of an alternative embodiment of the device in an inoperative position.

Referring now to FIGS. 6 and 7, an alternative embodiment of the invention torque transmitting device is illustrated as including actuating lever 104 pivotally mounted on the pin 38 and positioned laterally between the sides 15 and 17 of the input drive lever 12 and axially between the upper pawl 56, as viewed in FIG. 6, and the selector bar 80. The lever 104 is configured to abut the rightward facing, as viewed in FIG. 6, surface 81 of selector bar 80 at its leftward facing surface 106 and abut a generally leftwardly facing inclined surface 57 of the pawl 56 at a corresponding rightward facing inclined surface 108. The functional significances of these abutments will be explained in detail in the operational description below.

DESCRIPTION OF OPERATION

Figure 2:
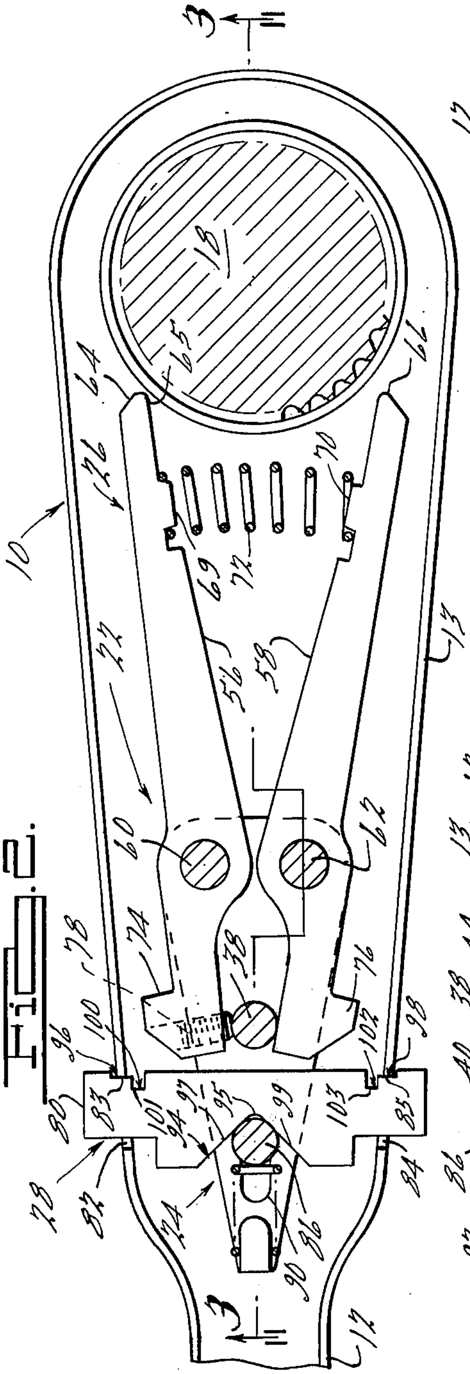
FIG. 2 is a fragmentary cross-sectional view of the device in its neutral position.
Figure 3:
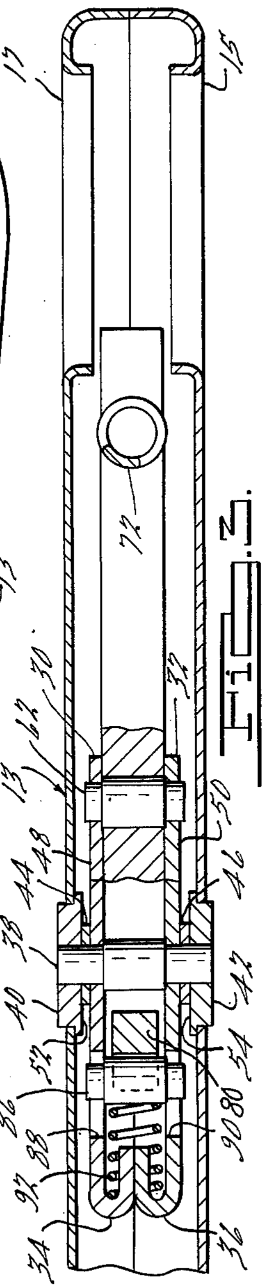
FIG. 3 is a fragmentary cross-sectional view taken along line 3—3 of FIG. 2.
Figure 4:
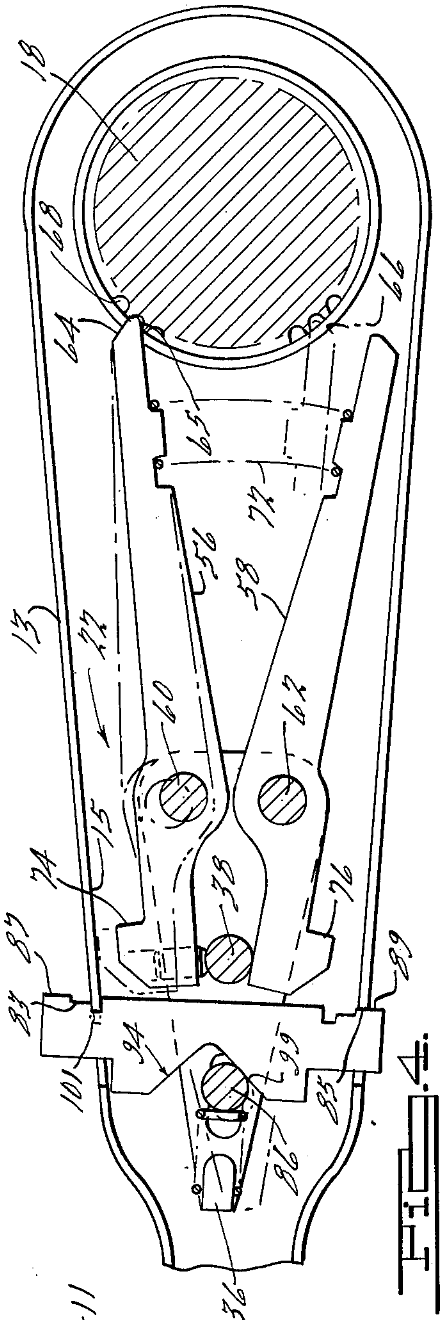
FIG. 4 is a fragmentary cross-sectional view of the device in one operative condition.
Figure 5:
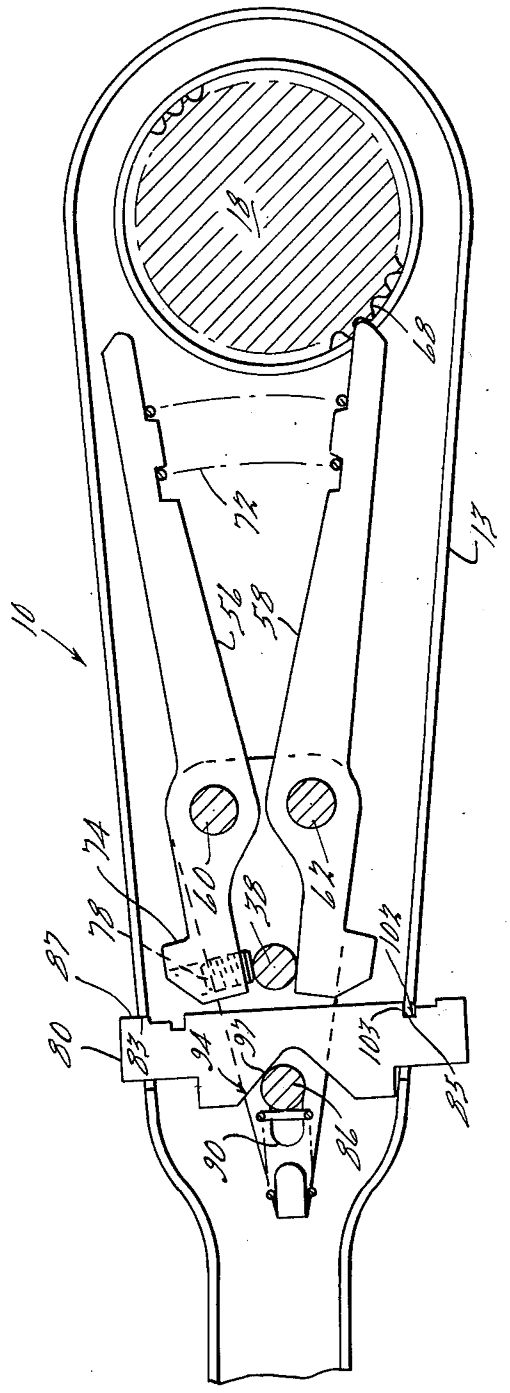
FIG. 5 is a fragmentary cross-sectional view of the device in another operative condition.

Three modes of operation are attainable in the invention torque transmitting device in the disclosed hoist embodiment, the neutral mode illustrated in FIG. 2, the forward, or lifting mode for hoisting applications illustrated in FIG. 4, and the reverse of lowering mode illustrated in FIG. 5.

In the neutral position illustrated in FIG. 2 the selector bar 80 is centrally positioned so that notches 96 and 98 abut leftward facing surfaces 83 and 85 of hub portion apertures 82 and 84, respectively. The selector bar 80 is manually so positioned and is urged into the abutting relationship by the biasing force of spring 92 loading shouldered pin 86 into the apex 95 formed by the notch 94. With the bar and the pin so positioned, the carrier subassembly 24 maintains the attitude shown in FIG. 2 in which the pawl pivot pins 60 and 62 are symmetrically disposed about the longitudinal center line of the hub portion 13. The pawls 56 and 58 are maintained in spaced apart relationship by action of the spring 72 tending to pivot them about their respective pivot pins 60 and 62. The magnitude of the pivotal travel of the pawl 56, and also of the assembled load of the spring 72, is determined by the position of the adjustment set screw 78, although fixed positions not employing this adjustment feature are, of course, possible. Inward positioning of the screw 78 tends to rotate the pawl 56 clockwise, displace its longitudinal axis from the pivotal axis of the pin 38, and increases the assembled load on the spring 72 and vice versa. With the carrier subassembly 24 in this symmetrical orientation, the load engaging portions 64 and 66 of the pawls 56 and 58 do not achieve engagement with the teeth 68 of the ratchet wheel 18 hence, rotation of the input lever 12 of the hoist 14 will not result in any movement of the output member 20 or the load.

In the position shown in FIG. 4, however, clockwise movement of the input lever 12 will rotate the ratchet wheel 18 causing a lifting of the load through the operation of the hoist 14. To accomplish this the selector bar 80 is displaced upward as viewed in FIG. 4 so that notch 100, the width of which is slightly larger than the wall thickness of the drive housing portion 13, engages the leftward facing edge 83 of hub portion aperture 82 while the lower rightward facing surface 89 of the selector bar 80 abuts the leftward facing surface 85 of hub portion aperture 84. The axial displacement of the surface 89 from the bottom surface 101 of notch 100 results in a clockwise rotation of the selector bar 80 as it moves translatively through the apertures 82 and 84. This motion of the bar 80 causes the shouldered pin 86 to move axially along the slots 88 and 90 formed in carrier plates 30 and 32 as it moves along the lower inclined surface 99 of the selector bar notch 94. Movement of the pin 86 creates an operating preload on the spring 92 and further serves to rotatively bias carrier plates 30 and 32 to the position shown in FIG. 4 in which the pivot pin 60 of pawl member 56 is positioned closer to the longitudinal center line of hub portion 13 than the pivot pin 62 of pawl member 58.

With the carrier so positioned, the pawl member 56 is brought into driving meshing engagement with the teeth 68 of the ratchet wheel 18 so that clockwise rotation of the lever 12 will produce corresponding rotation of the ratchet wheel 18 in lifting the load. Counterclockwise rotation of the lever 12, however, will cause an inward facing surface 65 of load engaging portion 64 of pawl 56 to contact a tooth 68 of ratchet wheel 18 at a contact angle which tends to produce sliding contact and to rotate the pawl 56 counterclockwise. Contact of the adjusting screw 78 with the pivot pin 38 of the carrier subassembly 24 limits this rotation; and the plates 30, 32 are rotated, carried by the pawl pivot pin 60. This movement causes the pin 86 to slide along the lower inclined surface 99 of selector bar notch 94 and along the slots 88, 90 of carrier plates 30, 32 against the spring 92. When surface 65 slides to a position passing over a tooth 68, spring 92 returns the pawl 56 and carrier and the carrier plates 30, 32 to their original positions in a ratchetlike movement.

In the reverse or lowering mode of operation illustrated in FIG. 5, the bottom surface 103 of notch 102 abuts the leftward facing surface 85 of hub portion aperture 84 while the top rightward facing surface 87 of the selector bar 80 abuts the leftward facing surface 83 of hub portion aperture 82 producing a somewhat counterclockwise rotation of the selector bar 80 and movement of the pin 86 along the upper inclined surface 97 of selector bar notch 94 as the pin 86 moves axially along the slots 88 and 90 in carrier plates 30 and 32 respectively. As in the lifting mode, the operating preload on spring 92 is attained and the carrier portion 24 is rotated to a position in which the pivot pin 62 assumes a position closer to the longitudinal center line of the drive housing portion 13 than the pivot pin 60. When in this position, counterclockwise rotation of the input lever 12 will produce corresponding rotation of the ratchet wheel 18 and the lowering of a load through the operation of the hoist 14. Reversal of rotation of the input lever 12 will produce the ratcheting motion as hereinbefore described in the discussion of the lifting mode. It should be understood throughout, of course, that the forward and reverse modes of operation while described here as they apply to the operation of the lever operated hoist, would similarly serve to reversibly rotate any torque drive member.

Referring now particularly to FIG. 4, it may be seen that the invention torque transmitting device provides the additional operating feature of indicating when the torque in excess of a predetermined amount is transmitted from the input lever 12 to the ratchet wheel 18 and hence to the hoist 14 or other device. It can be seen that the carrier assembly 24 and the pawl drive assembly 26 together form a biased toggle linkage. Clockwise rotation of the input lever 12 moves the carrier pivot pin 38 rotatively about the axis of the ratchet wheel 18 driving the pawl 56 into engagement with the teeth 68 of the ratchet wheel 18. A reaction is taken at the load engaging portion 64 of the pawl 56 having a component extending along a line of action between the point of engagement and the axis of the carrier pivot pin 38. Since the pawl pivot pin 60 is displaced from the axis of the pin 38 and the longitudinal axis of the pawl 56 is displaced from the axis of the pin 38 by an amount determined by the position of the screw 78, a net force couple is thereby created tending to rotate the pawl 56 clockwise about its pivot pin 60. The reaction taken at the pivot pin 60 creates another couple about the carrier pivot pin 38 tending to move the pin 60 and the plates 30, 32 counterclockwise. These couples, the net magnitude of which is largely adjustably determined by the position of the adjusting screw 78, are resisted by the pawl spring 72 whose assembled preload is also determined, as hereinbefore described, by the position of the adjusting set screw 78 and by the carrier spring 92 whose assembled preload is determined by the position of the selector bar 81. These preloads are established so that they may be overcome only by a force generated at the load engaging portion 64 of pawl 56 having a magnitude corresponding to a predetermined magnitude of torque. Thus an attempt to transmit a torque in excess of a predetermined magnitude will result in the collapse of the toggle linkage and the sudden pivotal movement of the pawl 56 to sharply bring its indicating portion 74 into contact with the inner surface 15 of the hub portion 13 as is indicated in phantom in FIG. 4. Both the sudden movement permitted by the low rate of the spring 72 and the audible indication afforded by the contact of the indicating portion 74 on the surface 15 provide the user of the device with an indication that a torque in excess of a predetermined value, typically the recommended load rating of the device, has been transmitted. Removing the force applied to the input lever 12 or reversal of its rotation will, however, return the pawl 56 to its original driving position. In the case of reversal, the pawl 56 moves in a ratchet-like motion over the teeth 68 of ratchet wheel 18 as has been described above. Operation in the reverse or lowering direction of FIG. 5 may similarly provide torque transmission and overload indication and a second adjusting screw may be provided to allow independent operation.

In the alternative embodiment illustrated in FIGS. 6 and 7, however, reverse rotation of or removal of the input force to the lever 12 does not re-engage pawl 56 into the driving condition. It can be seen that in that embodiment clockwise rotation of the pawl 56 in the lifting mode shown results in abutment of the inclined surface 57 of indicating portion 74 with corresponding inclined surface 108 of actuating lever 104. This pivots the lever 104 about the main pivot, the carrier pivot pin 38, causing the abutment of leftward facing surface 106 of lever 104 with rightward facing surface 81 of the selector bar 80 moving the notch 100 out of engagement with the aperture 82 of drive housing portion 13. When the notch 100 is disengaged, the carrier spring 92 urges the shouldered pin 86 against the lower inclined surface 99 of selector bar notch 94 to drive the selector bar 80 to its central neutral position as may be seen in FIG. 7. Upon reversal of rotation, the carrier assembly 24 and the shouldered pin 86 will assume the neutral position shown in FIG. 2. Further driving engagement of the ratchet wheel 18 is impossible without manual repositioning of the selector bar 80 to the selected lift position. This alternative embodiment provides a further clear indication of the transmission of a torque in excess of the predetermined value and prevents continued applications of the overload without conscious repositioning of the selector bar 80.

Although the present invention has been described in only two embodiments it will be clear to those skilled in the art that a number of modifications may be made without departing from the spirit of the invention. For example, if the neutral position is not desired for a particular application of the torque transmitting device, the shouldered pin 86 and cooperating slots 88 and 90 may be eliminated and the notch 94 and selector bar 80 may be reconfigured to form a seat for the spring 92. Additionally, the single actuator lever of the alternative embodiment of FIGS. 6 and 7 is shown to be operative in only direction of rotation. It will be obvious to one skilled in the art that a pair of such actuator levers could be included to provide positioning to the neutral mode of operation upon the occurrence of the transmission of a torque in excess of a predetermined value in either direction. It will similarly be obvious to those skilled in the art that a unidirectional torque transmitting device incorporating a single pawl could be constructed without departing from the teachings of the present invention.

What is claimed is:

1. A torque transmitting and indicating device comprising:

A. a rotatable input drive member having a housing portion encompassing its rotational axis;

B. an output drive member rotatable about said input drive rotational axis and adapted to be connected to a load;

C. a carrier member disposed within said housing portion;

D. means mounting said carrier member within said housing portion for pivotal movement relative to said housing portion about an axis parallel to but displaced from said input drive rotational axis;

E. pawl drive means having a load engaging portion at one end thereof;

F. mounting means for carrying said pawl drive means for pivotal movement with said carrier member and for permitting pivotal movement of said pawl drive means relative to said carrier member about an axis parallel to said input drive rotational axis between a first operative position and a second indicating position;

G. means pivotally biasing said pawl drive means into said first position; and

H. means pivotally biasing said carrier member and thereby said pawl drive means into driving engagement with said output drive member at a point thereon displaced from a plane containing said pawl drive and carrier pivotal axes whereby rotation of said input drive member in one direction effects the transmission of torque to said output member and a resultant force reaction at said point of engagement acts against said carrier biasing means and said pawl biasing means to pivot said pawl drive means to said second indicating position when said torque exceeds a predetermined magnitude.

2. The device as defined in claim 1, wherein said pivotal biasing means is further operative to permit said pawl drive means to be ratchetly disengaged from said output drive member when said input drive is rotated in another direction.

3. The device as defined in claim 1 wherein said pawl drive means comprises a pair of elongated pawl members and wherein said device further comprises selector means operatively connected to said pivotal biasing means to effect selective movement of said carrier member between a neutral position wherein said pawl members are disengaged from said output drive member, a first driving position wherein one of said pawl members drivingly engages said output drive member for rotation in one direction and a second driving position wherein the other of said pawl members engages said output drive member for rotation in the other direction.

4. The device as defined in claim 3 wherein said selector means comprises an elongated bar operatively connected to said carrier biasing means, slideably received in said input drive member housing, and moveable in a plane perpendicular to said carrier pivotal axis between positions corresponding to said neutral and first and second driving positions, said bar having disposed on one face thereof a plurality of detents for longitudinally retaining said bar with respect to said housing in each of said bar positions, said carrier biasing means being effective to urge said bar face against said housing to cause engagement of said detents therewith.

5. The device as defined in claim 4 and further comprising disengaging means pivotally carried with at least one of said pawl members and operative upon movement of said pawl member to said indicating position to engage said bar face and move the detents disposed thereon translatively out of engagement with said housing, thereby permitting said carrier biasing means to urge said bar and said carrier member toward said neutral, disengaged position.

6. The device as defined in claim 1 wherein said pawl biasing means and said carrier biasing means comprise springs having a relatively low rate whereby the force exerted by the springs is substantially constant for all operating positions of said carrier member and said pawl drive means and therefore said movement of said pawl drive means to said second indicating position occurs suddenly upon the application of a substantially constant rotative force to said input drive member during transmission of torque in excess of said predetermined magnitude.

7. The device as defined in claim 6 wherein said input drive member housing includes stop means and said pawl drive means includes an indicating portion which contacts said stop means upon the sudden movement of said pawl drive means to said second indicating position thereby creating an audible indication of the transmission of torque in excess of said predetermined magnitude.

8. The device as defined in claim 1 and further comprising means for adjustably displacing said pawl drive means pivotal axis from the plane containing said point of engagement of said load engaging portion and said output drive member and said carrier pivotal axis and for defining the assembled load of said pawl biasing means thereby adjustably determining said magnitude of torque.

9. The device as defined in claim 1 and further comprising means operative upon the occurrence of said pivotal movement of said pawl drive means to said second indicating position to disable said carrier biasing means so that said carrier member and thereby said pawl drive means pivots to a position wherein said pawl drive means is disengaged from said output drive member upon the reversal of rotation of said input drive member.

10. In a lever operated hoist for drawing and releasing a load having a rotatable input drive member and an elongated input drive lever pivotally mounted thereon and including means for indicating the drawing or releasing thereby of a load in excess of a predetermined magnitude, the improvement wherein said indicating means comprises:

A. means for drivingly engaging said input drive member and said input drive lever in response to pivotal movement of said drive lever in one direction to transmit torque therebetween;

B. means for ratchetly disengaging said input drive member and said input drive lever in response to pivotal movement of said drive lever in the other direction whereby said drive lever movement is not transmitted to said input drive member; and C. means for permitting, upon application of a load at any point along the longitudinal axis of said lever resulting in the drawing or releasing of a load in excess of said predetermined value, certain movement of said lever without a corresponding movement of said input drive member, thereby indicating the drawing or releasing of a load in excess of said predetermined value.

11. The hoist as defined in claim 10 wherein said torque transmitting and indicating means comprises:

A. a drive housing portion formed in said drive lever adjacent to and encompassing the pivotal axis thereof;

B. a carrier member disposed within said housing portion;

C. means mounting said carrier member within said housing portion for pivotal movement relative to said housing portion about an axis parallel to but displaced from said input drive lever pivotal axis;

D. pawl drive means having a load engaging portion at one end thereof;
E. mounting means for carrying said pawl drive means for pivotal movement with said carrier member and for permitting pivotal movement of said pawl drive means relative to said carrier member about an axis parallel to said input drive lever pivotal axis between a first operative position and a second indicating position;
F. means pivotally biasing said pawl drive means into said first position; and
G. means pivotally biasing said carrier member and thereby said pawl drive means into driving engagement with said hoist input drive member at a point thereon displaced from a plane containing said pawl drive and carrier member pivotal axes whereby rotation of said input lever in one direction effects the transmission of torque to said hoist input drive member and a resultant force reaction at said point of engagement acts against said carrier biasing means and said pawl biasing means to pivot said pawl drive means to said second indicating position when said load exceeds a predetermined magnitude.

12. The hoist as defined in claim 11, wherein said pivotal biasing means is further operative to permit said pawl drive means to be ratchetly disengaged from said hoist input drive member when said input drive is rotated in another direction thereby effecting said ratcheting disengagement of said input drive member and said input drive lever.

13. The hoist as defined in claim 11 wherein said pawl drive means comprises a pair of elongated pawl members and wherein said hoist further comprises selector means operatively connected to said pivotal biasing means to effect selective movement of said carrier member between a neutral position wherein said pawl members are disengaged from said hoist input drive member, a first driving position wherein one of said pawl members drivingly engages said hoist input drive member for rotation in one direction and a second driving position wherein the other of said pawl members engages said hoist input drive member for rotation in the other direction.

14. The hoist as defined in claim 13 wherein said selector means comprises an elongated bar operatively connected to said carrier biasing means, slideably received in said input drive member housing, and moveable in a plane perpendicular to said carrier pivotal axis between positions corresponding to said neutral and first and second driving positions, said bar having disposed on one face thereof a plurality of detents for longitudinally retaining said bar with respect to said housing in each of said bar positions, said carrier biasing means being effective to urge said bar face against said housing to cause engagement of said detents therewith.

15. The hoist as defined in claim 14 and further comprising disengaging means pivotally carried with at least one of said pawl members and operative upon movement of said pawl member to said indicating position to engage said bar face and move the detents disposed thereon translatively out of engagement with said housing, thereby permitting said carrier biasing means to urge said bar and said carrier member toward said neutral, disengaged position.

16. The hoist as defined in claim 11 wherein said pawl biasing means and said carrier biasing means comprise springs having a relatively low rate whereby the force exerted by the springs is substantially constant for all operating positions of said carrier member and said pawl drive means and therefore said movement of said pawl drive means to said second indicating position occurs suddenly upon the application of a substantially constant rotative force to said input drive lever during the drawing or releasing of a load in excess of said predetermined magnitude.

17. The hoist as defined in claim 16 wherein said drive housing portion includes stop means and said pawl drive means includes an indicating portion which contacts said stop means upon the sudden movement of said pawl drive means to said second indicating position thereby effecting an audible indication of the drawing or release of a load in excess of said predetermined magnitude.

18. The hoist as defined in claim 11 and further comprising means for adjustably displacing said pawl drive means pivotal axis from the plane containing said point of engagement of said load engaging portion and said hoist input drive member and said carrier pivotal axis and for defining the assembled load of said pawl biasing means thereby adjustably determining said magnitude of load.

19. The hoist as defined in claim 11 and further comprising means operative upon the occurrence of said pivotal movement of said pawl drive means to said second indicating position to disable said carrier biasing means so that said carrier member and thereby said pawl drive means pivots to a position wherein said pawl drive means is disengaged from said output drive member upon the reversal of rotation of said input drive lever.

20. A hoist for drawing and releasing a load comprising:
A. a rotatable input drive shaft including a ratchet wheel portion;
B. an input drive lever including a hollow housing portion pivotally mounted on said shaft and a handle portion extending from said hollow housing portion;
C. a carrier plate mounted in said hollow housing portion for pivotal movement about an axis which is parallel to the pivotal axis of said lever and lying substantially in plane including the longitudinal axis of said lever;
D. a pair of elongated pawls pivotally mounted intermediate their ends on said carrier plate on a pair of axes which are parallel to the pivotal axis of said carrier plate and disposed on opposite sides of said plane, each pawl including a load engaging portion adjacent one end disposed within said housing in juxtaposition to said ratchet wheel portion and an indicating portion adjacent its other end disposed within said housing in juxtaposition to a confronting interior surface of said housing;
E. selector means operative to selectively pivotally move said carrier plate between a neutral position wherein the load engaging portion of both of said pawls is disengaged from said ratchet wheel portion and alternate forward and reverse driving positions wherein the load engaging portion of one of said pawls respectively engages said ratchet wheel portion; and
F. spring means operative to:
1. selectively bias said pawls and said carrier plate into one of said driving positions; and 2. permit, upon transmittal of torque in excess of a predetermined value through said carrier plate and selected pawl to said ratchet wheel pivotal portion, movement of the selected pawl to an indicating position wherein the indicating portion of the selected pawl contacts the related confronting interior surface.

21. The hoist as defined in claim 20, wherein said input lever is formed from a pair of substantially identical generally concave stampings fixedly secured to one another.

22. The hoist as defined in claim 20 wherein said selector means includes a selector bar, slidingly received through apertures formed on said housing portion, and lying substantially in a plane perpendicular to said lever plane and including detents formed thereon for engaging said housing portion in positions corresponding to said neutral and driving positions of the carrier plate, and whereby said hoist further comprises at least one actuating lever mounted for pivotal movement about the pivotal axis of said carrier plate and engageable between one of said pawls and said selector bar such that movement of said one pawl to said indicating position effects disengagement of said selector bar detent from said housing portion.

23. A torque transmitting and indicating device comprising:

A. an elongated rotatable input drive member;

B. an output drive member rotatable about said input drive rotational axis and adapted to be connected to a load;

C. torque transmitting and indicating means carried in said input drive member and operative to:

1. drivingly engage said input drive member and said output drive member in response to pivotal movement of said input drive member in one direction to transmit torque therebetween;
2. ratchetly disengage said input drive member and said output drive member in response to pivotal movement of said input drive member in the other direction whereby said input drive member movement is not transmitted to said output drive member; and
3. permit, upon application of a load at any point along the longitudinal axis of said input drive member resulting in the transmission of torque in excess of a predetermined magnitude, certain movement of said input drive member without a corresponding movement of said output drive member, thereby indicating the transmission of torque in excess of said predetermined magnitude.

* * * * *